United States Patent [19]
Hamaekers

[11] Patent Number: 5,501,531
[45] Date of Patent: Mar. 26, 1996

[54] CARDAN SHAFT BEARING

[75] Inventor: Arno Hamaekers, Gorxheimertal-Unterfl, Germany

[73] Assignee: Firma Carl Freudenberg, Weinheim, Germany

[21] Appl. No.: 241,380

[22] Filed: May 11, 1994

[30] Foreign Application Priority Data

May 21, 1993 [DE] Germany ............ 43 17 062.5

[51] Int. Cl.⁶ .................................. F16C 27/06
[52] U.S. Cl. .................................. 384/536; 384/581
[58] Field of Search .................. 384/536, 535, 384/581, 582

[56] References Cited

U.S. PATENT DOCUMENTS

| | | | |
|---|---|---|---|
| 2,563,980 | 8/1951 | Wahlberg | 384/536 |
| 2,608,451 | 8/1952 | Pierce, Jr. | 384/536 |
| 2,933,354 | 4/1960 | Primeau | 384/536 |
| 3,639,015 | 2/1972 | Maas | 384/536 |
| 3,961,829 | 6/1976 | Bowen et al. | 384/536 |
| 4,722,618 | 2/1988 | Matsumoto | 384/536 |

FOREIGN PATENT DOCUMENTS

| | | | |
|---|---|---|---|
| 1029525 | 6/1953 | France | 384/535 |
| 1086999 | 2/1955 | France | 384/535 |
| 2068477 | 4/1984 | United Kingdom . | |

*Primary Examiner*—Thomas R. Hannon
*Attorney, Agent, or Firm*—Kenyon & Kenyon

[57] ABSTRACT

A Cardan shaft bearing is disclosed in which the outer ring of an antifriction bearing and a retainer ring are connected together by a rubber ring which is vulcanized in place. The outer ring and the retainer ring rest with radial elasticity against each other. The rubber ring has a U-shaped profile which is open parallel to the axis of the Cardan shaft bearing. The rubber ring is fixed on the outer ring and on the retainer ring at least in part on the axial ends of these rings. The inner ring of the antifriction bearing is provided with rubberizing on the side facing the shaft.

24 Claims, 2 Drawing Sheets

CARDAN SHAFT BEARING

BACKGROUND OF THE INVENTION

1. Field of the Invention

The present invention relates to a Cardan shaft bearing in which the outer ring of an antifriction bearing and a retainer ring are connected together by a rubber ring which is vulcanized in place. In the Cardan shaft bearing of the present invention, the outer ring and the retainer ring rest with radial elasticity against each other.

2. Description of the Related Art

A Cardan shaft bearing is shown in British Patent 2 068 477. In the device shown in that patent, the outer ring of a rubber bearing and a retainer ring which forms a part of a bearing block are connected together by a rubber ring which is vulcanized between them. The rubber ring is block-shaped and is provided on both sides, in an axial direction, with groove-shaped recesses which extend around the circumference. The radial yieldability of this type of bearing is insufficient for many situations due to the block-shaped configuration of the rubber ring. Furthermore, the securement of the rubber ring on the radially adjoining rings is not conducive to long life, particularly if the shaft to be supported has some wobbling movement. The tensile and shear stresses occurring in the region of the holding surfaces can lead to premature failure of the bearing in such a situation.

SUMMARY OF THE INVENTION

The object of the present invention is to provide a Cardan shaft bearing to improve the securement of the rubber ring on the outer bearing ring and the retainer ring, in a manner which improves the yieldability of the bearing in the radial and axial directions. It is a further object of the present invention to provide a Cardan shaft bearing such that working, i.e., machining, of the surface of the shaft is no longer required.

In order to achieve the objects of the present invention, the rubber ring has a U-shaped profile which is open parallel to the axis of the Cardan shaft bearing. In addition, the rubber ring is fixed to both the outer ring and the retainer ring at least in part at their axial ends. Also, the inner ring of the antifriction bearing is provided with rubberizing on the side facing the shaft. It is advantageous that the Cardan shaft bearing of the present invention have a working region of soft elasticity and be simple to manufacture. In the present invention, the rubber ring—in addition to being fixed on the outer circumferential surface of the outer ring and on the inner circumferential surface of the retainer ring— is fastened by adherence at least partly to the axial ends of the outer ring and the retainer ring. As a result of this arrangement, good stability of the rubber-metal connection is obtained even if the shaft to be supported wobbles or shifts in the axial direction. This arrangement provides good properties in use for a long period of time. Because the inner ring of the antifriction bearing is provided with rubberizing on the side facing the shaft, introduction of shaft vibrations into the bearing can be reduced. Furthermore, the fact that no working, i.e., machining of the shaft nor an exact fit between the antifriction bearing and the shaft is required is an advantage of the present invention.

In one advantageous embodiment of the present invention, the rubberizing between the shaft and inner ring of the antifriction bearing can be provided with profiling on the side facing the shaft. The profiling can be formed by grooves which are radially open in the direction of the shaft, the grooves being completely open on both sides parallel to the axis of the Cardan shaft bearing. The rubberizing in this embodiment surrounds the unworked shaft with a friction lock only in partial regions of the circumference of the rubberizing. Cost-intensive tolerancing between the inner ring of the antifriction bearing and the shaft therefore can be avoided.

In another embodiment of the present invention, the retainer ring can be supported with relative radial elasticity on a rubber spring ring. In this embodiment, the spring path in the radial direction between the outer ring and the retainer ring is increased. This arrangement provides definite advantages in that the spring ring can be so dimensioned and shaped that, upon extreme deflections of the antifriction bearing relative to the retainer ring, an end-position damping is provided. Upon radial deflections of the shaft, the Cardan shaft bearing is of a comparatively large yieldability until the outer ring comes into contact with the spring ring. In order to dampen extreme deflections, the spring ring is made less resilient. The spring ring can, for instance, be provided with a reinforcement. Impact noises as well as an impermissibly high stressing of the elastomeric material can thereby be avoided.

The spring ring of the present invention can have liquid-filled cavities distributed in the circumferential direction which are in communication with each other through openings. This embodiment of the Cardan shaft bearing of the present invention results in hydraulic damping of extreme deflections of the bearing in the radial direction relative to the retainer ring. The liquid-filled cavities are preferably separated from each other by flexible partition walls of membrane-type thinness, in order to effect good decoupling of acoustically disturbing vibrations. The intermediate ring can be manufactured of a low-damping natural-rubber stock in order to prevent the transfer of high-frequency, acoustically active vibrations from one of the rings to the other. Preferably, several liquid-filled chambers which succeed each other in the circumferential direction are used in order to effect a damping of vibrations, regardless of the direction in which they are introduced. Upon striking of the antifriction bearing against the spring ring, the latter is compressed in the radial direction in a partial area, and as a result the volume of liquid originally present in a chamber is shifted through the damping openings into the adjacent chambers of relatively lower pressure. By displacement of the liquid, a large amount of energy is consumed so that impact noises are suppressed. The direction of radial movements of the Cardan shaft cannot be readily predetermined, and it is therefore desirable for the chambers to be distributed as uniformly as possible in the circumferential direction.

The chambers can be closed by a retainer ring on the radially outwardly facing side, the retainer ring and a bearing ring arranged on the outer circumference of the spring ring being connected together by a force fit. The mounting of such a bearing is particularly advantageous due to its simple construction. The complete assembly of the hydraulically damping bearing of the present invention is effected by the pulling over and flanging of the retainer ring under damping fluid. The elastic material of the spring ring seals the liquid-filled cavities from the retainer ring and the surroundings.

The bearing ring of the present invention can be include reinforcement of the spring ring within the region in which it is fixed within the retainer ring.

The spring ring and the rubber ring of the present invention can be developed as a single piece. In this way, there is used a single-piece rubber-metal assembly which can be removed in conventional manner from a mold. Secondary means for fastening the parts to each other can thereby be dispensed with, and additional sealing is not required.

The retainer ring and the outer ring can have stop surfaces facing each other, the stop surfaces being covered at least in part by a damping layer of rubber. In this embodiment, impact noises resulting from extreme deflections of the retainer ring and the outer ring relative to each other are avoided. By reducing peak loads upon contact between the two parts, the mechanical load on the antifriction bearing and the elastomeric material of the spring ring is limited, resulting in a longer useful life of the bearing.

The damping layer and the rubber ring of the present invention can be developed as a single piece. Additional operations for manufacturing the damping layer can thereby be avoided, which favors simple manufacture of the bearing. Furthermore, the occurrence of corrosion is avoided by the at least partial covering of the metal parts.

BRIEF DESCRIPTION OF THE DRAWINGS

The object of the invention will be further explained below with reference to the drawings, in which.

DESCRIPTION OF THE PREFERRED EMBODIMENTS

Figure 1:
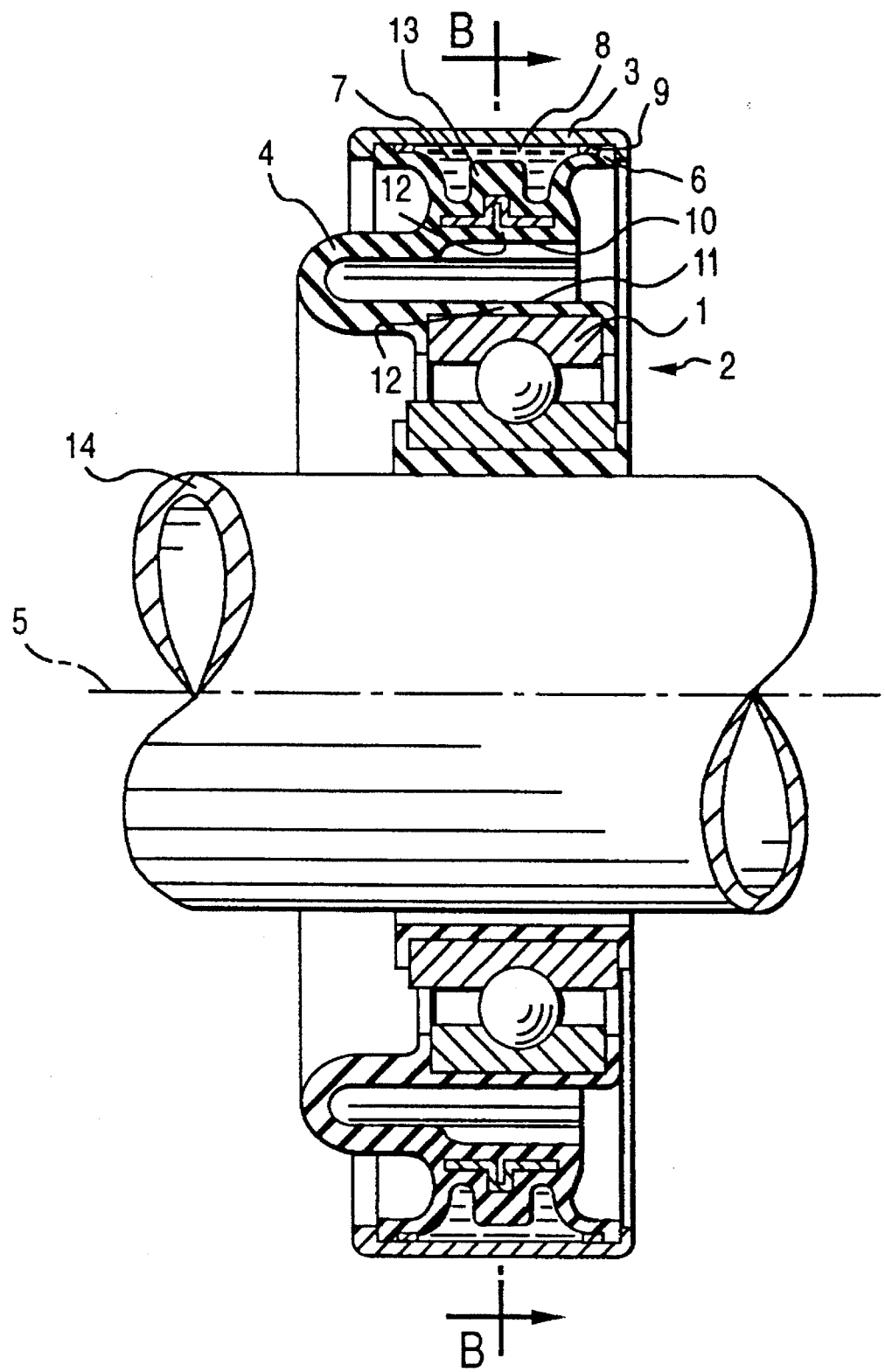
FIG. 1 shows an embodiment of the Cardan shaft bearing of the present invention, in cross-section along line A—A of FIG. 2.
Figure 2:
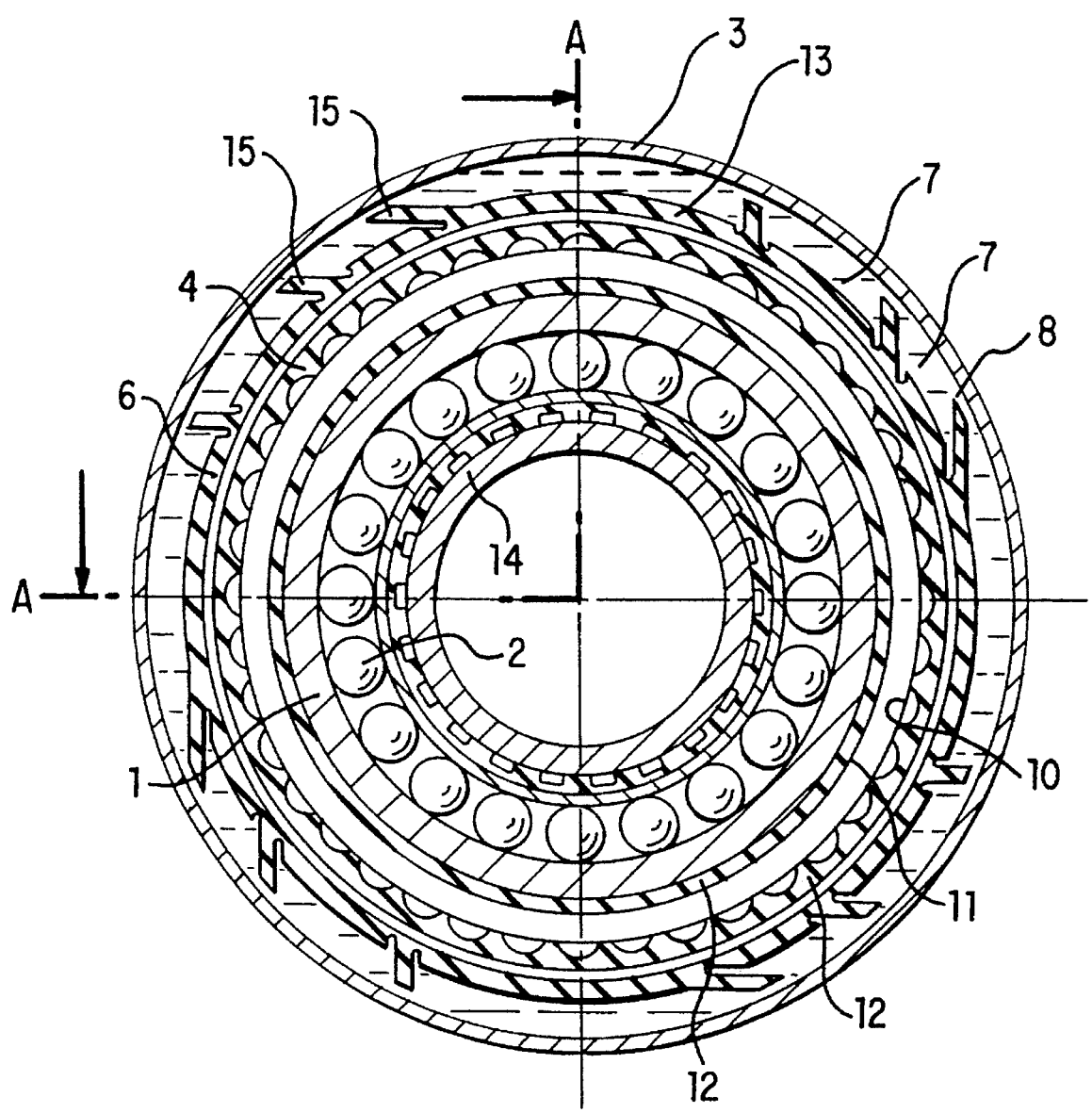
FIG. 2 shows the bearing of FIG. 1, in cross-section along line B—B of FIG. 1.

The Cardan shaft bearing shown in FIGS. 1 and 2 includes an outer ring 1 of an antifriction bearing 2 and a retainer ring 3, which are connected to each other by a rubber ring 4. The rubber ring 4 is vulcanized in place, and the outer ring 1 and retainer ring 3 rest with both radial and axial elasticity against each other. The rubber ring 4 surrounds, in a radial direction on its inside, the outer ring 1 of the antifriction bearing 2 in the region of the two axial ends of the outer ring 1. From the point of attachment of the rubber ring 4 to the outer ring 1, the rubber ring 4 extends with a U-shaped profile which is open parallel to the axis 5, in a radial direction. The rubber ring 4 is formed as a single piece with spring ring 6 which is adhesively attached to a bearing ring 9 and is held in liquid-tight manner within the retainer ring 3. The damping layer 12 of the regions of the surface of the rubber ring 4 which face each other within the U-shaped profile are configured in a sine shape along the circumference in this embodiment in order to avoid impact noises. The elastomeric material of the rubber ring 4 surrounds the outer ring 1 of the antifriction bearing 2 with a flat surface. The stop surface 10 of the rubber ring 4 lies opposite the stop surface 11 of the outer ring 1 and has a wave-like profile extending on its circumference. The cavities 7 which are delimited by the spring ring 6 and the retainer ring 3, are uniformly distributed in a circumferential direction, are filled with a damping liquid and are connected in liquid communication with each other. The liquid-filled cavities 7 are separated from each other by flexible partition walls of membrane-type thinness and communicate with each other through damping openings. Upon radial movement of the antifriction bearing 2 with respect to the retainer ring 3 in a radial direction, there is produced a pressing together of the cavities 7 present in that direction and displacement of liquid through the damping openings 8 into the adjacent cavities 7, obtaining good damping action. Suddenly occurring abrupt loads are thereby prevented and the occurrence of impact noises as well as mechanical overstressing are avoided. Within the cavities 7 there are provided stop buffers 13 developed as one piece with the rubber ring 4, the stop buffers being spaced radially from the retainer ring 3 in the vibration-free condition shown in FIG. 1.

The antifriction bearing 2 is provided with a rubberizing on the side facing the shaft 14. Vibrations introduced into the bearing as a result of operation are reduced by this feature. Furthermore, it is advantageous that no working, i.e., machining, of the shaft 14 or exact fit between the antifriction bearing 2 and the shaft 14 is required. In order to compensate for tolerances, the rubber ring of the inner ring is profiled in a manner similar to the stop surface 10.

FIG. 2 is a section along the line B—B of the bearing of FIG. 1. The partitions 15 are associated in a suitable manner with the axis 5 of the Cardan shaft bearing shown. Relative radial displacements of the antifriction bearing 2 with respect to the retainer ring 3 do not lead to compressive stresses in the partitions 15. In this way, acoustically active high-frequency vibrations upon contact are also not transmitted via the partitions 15. The liquid-filled cavities 7 are in liquid communication with each other, the partitions 15 and the retainer ring 3 forming throttle openings 8 between the cavities 7. The damping action is based on the forcing of liquid through the throttle openings 8 from a cavity 7 of relatively higher pressure into adjacent cavities 7 of relatively lower pressure. The stop surface 10 which is arranged radially adjacent to the rubberized outer ring 1 of the antifriction bearing 2 has a sine-shaped profile extending in the circumferential direction. As a result of this sine-shaped profile, end-position damping is obtained as well as the avoidance of impact noises. The shaft 14 is not worked, i.e., machined on its surface, which is advantageous from an economic standpoint. The antifriction bearing 2 is provided on its inner circumference with rubberizing which engages, at least in part in a friction-locked manner, the unworked shaft. Cost-intensive fits between the inner ring of the antifriction bearing 2 and the shaft 14 thereby can be avoided.

I claim:

1. A shaft bearing for a rotating shaft comprising:

an antifriction bearing comprising an inner and an outer ring, said inner ring comprising rubberizing on a radial surface faring said shaft;

a retainer ring;

a rubber ring connecting said outer ring and said retainer ring, said rubber ring comprising a U-shaped profile which is open in a direction parallel to an axis of said shaft bearing, said rubber ring being fixed at least partially on axial ends of said outer ring and said retainer ring.

2. The shaft bearing of claim 1, wherein:

said rubberizing has profiling on a radial surface facing said shaft.

3. The shaft bearing of claim 2, wherein:

said profiling comprises grooves which are open towards said shaft.

4. The shaft bearing of claim 1, wherein:

said rubber ring and said outer ring have stop surfaces facing each other and wherein said stop surfaces are covered at least in part by an elastic damping layer.

5. The shaft bearing of claim 4, wherein:

said damping layers and said rubber ring are formed as a single piece.

6. The shaft bearing of claim 4, wherein:

at least one of said damping layers is configured in a sine shape.

7. A shaft bearing for a rotating shaft comprising:

an antifriction bearing comprising an inner and an outer ring, said inner ring comprising rubberizing on a radial surface facing said shaft;

a retainer ring;

a rubber ring connecting said outer ring and said retainer ring, said rubber ring comprising a U-shaped profile which is open in a direction parallel to an axis of said shaft bearing, said rubber ring being fixed at least partially on axial ends of said outer ring and said retainer ring, wherein said retainer ring rests on an elastic spring ring.

8. The shaft bearing of claim 7, wherein:

said spring ring comprises liquid-filled cavities distributed circumferentially, and wherein said liquid-filled cavities are in communication with each other via openings.

9. The shaft bearing of claim 8, wherein:

said liquid-filled cavities are sealed in a liquid-tight manner by said retainer ring on a radially outwardly facing side of said liquid-filled cavities.

10. The shaft bearing of claim 8, wherein:

said liquid-filled cavities are separated from each other by flexible partition walls of membrane-type thinness.

11. The shaft bearing of claim 7, wherein:

said retainer ring and a bearing ring arranged on an outer circumference of said spring ring are connected by a force fit.

12. The shaft bearing of claim 11, wherein:

said bearing ring reinforces said spring ring.

13. The shaft bearing of claim 7, wherein:

said spring ring and said rubber ring are formed as a single piece.

14. A shaft bearing for a rotating shaft comprising:

an antifriction bearing comprising an inner and an outer ring, said inner ring comprising rubberizing on a radial surface facing said shaft;

a retainer ring;

an elastic spring ring connected to said retainer ring, said spring ring comprising liquid-filled cavities distributed circumferentially, said liquid-filled cavities being in communication with each other via openings; and a rubber ring connecting said outer ring and said spring ring, said rubber ring comprising a U-shaped profile which is open in a direction parallel to an axis of said shaft bearing.

15. The shaft bearing of claim 14, wherein:

said rubberizing has profiling on a radial surface facing said shaft.

16. The shaft bearing of claim 15, wherein:

said profiling comprises grooves which are open towards said shaft.

17. The shaft bearing of claim 14, wherein:

said liquid-filled cavities are sealed in a liquid-tight manner by said retainer ring on a radially outwardly facing side of said liquid-filled cavities.

18. The shaft bearing of claim 14, wherein:

said retainer ring and a bearing ring arranged on an outer circumference of said spring ring are connected by a force fit.

19. The shaft bearing of claim 18, wherein:

said bearing ring reinforces said spring ring.

20. The shaft bearing of claim 14, wherein:

said spring ring and said rubber ring are formed as a single piece.

21. The shaft bearing of claim 14, wherein:

said rubber ring and said outer ring have stop surfaces facing each other and wherein said stop surfaces are covered at least in part by an elastic damping layer.

22. The shaft bearing of claim 21, wherein:

said damping layers and said rubber ring are formed as a single piece.

23. The shaft bearing of claim 21, wherein:

at least one of said damping layers is configured in a sine shape.

24. The shaft bearing of claim 14, wherein:

said liquid-filled cavities are separated from each other by flexible partition walls of membrane-type thinness.

* * * * *